United States Patent [19]
Brown et al.

[11] Patent Number: 5,923,552
[45] Date of Patent: Jul. 13, 1999

[54] SYSTEMS AND METHODS FOR FACILITATING THE EXCHANGE OF INFORMATION BETWEEN SEPARATE BUSINESS ENTITIES

[75] Inventors: Keith T. Brown; Philip B. Brown; J. William Waddell, all of Durham; Jeffrey J. André, Raleigh, all of N.C.

[73] Assignee: BuildNet, Inc., Durham, N.C.

[21] Appl. No.: 08/775,276

[22] Filed: Dec. 31, 1996

[51] Int. Cl.[6] ............................. G06F 17/00; G06F 17/60
[52] U.S. Cl. .............................. 364/468.06; 364/468.03; 364/468.2; 705/7; 705/8; 705/9
[58] Field of Search .................... 364/468.02–468.08, 364/468.13, 468.2; 345/961, 963, 431, 357, 348; 705/8, 26, 27, 28, 29, 9, 10, 7; 395/672, 673, 676, 826

[56] References Cited

U.S. PATENT DOCUMENTS

| | | | |
|---|---|---|---|
| 4,459,663 | 7/1984 | Dye | 705/29 |
| 4,700,318 | 10/1987 | Ockman | 345/431 |
| 4,852,001 | 7/1989 | Tsushima et al. | 705/8 |
| 4,937,743 | 6/1990 | Rassman et al. | 705/8 |
| 5,053,970 | 10/1991 | Kurihara et al. | 364/468.1 |
| 5,111,391 | 5/1992 | Fields et al. | 705/9 |
| 5,233,533 | 8/1993 | Edstrom et al. | 364/468.09 |
| 5,255,181 | 10/1993 | Chapman et al. | 705/8 |
| 5,283,865 | 2/1994 | Johnson | 345/357 |
| 5,315,509 | 5/1994 | Natarajan | 705/28 |
| 5,319,542 | 6/1994 | King, Jr. et al. | 705/27 |
| 5,343,387 | 8/1994 | Honma et al. | 705/9 |
| 5,367,627 | 11/1994 | Johnson | 345/357 |
| 5,369,570 | 11/1994 | Parad | 705/8 |
| 5,381,332 | 1/1995 | Wood | 705/8 |
| 5,406,476 | 4/1995 | Deziel, Jr. et al. | 705/8 |
| 5,442,561 | 8/1995 | Yoshizawa et al. | 364/468.06 |
| 5,450,317 | 9/1995 | Lu et al. | 705/10 |
| 5,467,268 | 11/1995 | Sisley et al. | 705/9 |
| 5,487,144 | 1/1996 | Takahashi et al. | 345/348 |
| 5,493,490 | 2/1996 | Johnson | 705/26 |
| 5,548,506 | 8/1996 | Srinivasan | 705/8 |
| 5,548,518 | 8/1996 | Dietrich et al. | 364/468.06 |
| 5,757,648 | 5/1998 | Nakamura | 364/474.11 |
| 5,764,543 | 6/1998 | Kennedy | 364/578 |

FOREIGN PATENT DOCUMENTS

| | | |
|---|---|---|
| 0 466 089 | 1/1992 | European Pat. Off. . |
| 2 293 902 | 4/1996 | United Kingdom . |
| WO 95/33236 | 12/1995 | WIPO . |

OTHER PUBLICATIONS

Brown, Keith T.; *The Builders' Revolution*; pp. 185–257; ISBN: 0–9649339–O–X; Sun Forest Systems Publishing 1995.

Leuthold, Jim; *CPM scheduling is key to project efficiency; critical path method; Construction ManagementColumn*; vol. 69; No. 5; p. 43; ISSN: 0033–4801, Pulp & Paper, Miller Freemans Inc. 1995.

Valigra, Lori; *Saturn's NT Effect*; vol. 3, No. 6; p. 040; Client/Sewer Computing, Senting Publishing Co. 1996.

*Primary Examiner*—William Grant
*Assistant Examiner*—Sheela S. Rao
*Attorney, Agent, or Firm*—Myers Bigel Sibley & Sajovec, P.A.

[57] ABSTRACT

Systems, methods, and computer program products synchronize product fabrication schedules with supplier schedules. A fabrication schedule is obtained from a fabricator data processing system, and supplier schedules are obtained from respective supplier data processing systems. Restrictive links are established between the fabrication schedule and the supplier schedules. Each restrictive link defines the supplier that will perform a work stage, and can also define the starting and ending times for both fabrication and supplier schedules. Float time preceding a selected activity starting time is assigned and utilized to absorb delays in completing activities preceding the selected activity. A computer based product catalog system automatically distributes and updates product information.

8 Claims, 11 Drawing Sheets

SYSTEMS AND METHODS FOR FACILITATING THE EXCHANGE OF INFORMATION BETWEEN SEPARATE BUSINESS ENTITIES

FIELD OF THE INVENTION

The present invention relates generally to electronic communications and more particularly to electronic communications via computer networks.

BACKGROUND OF THE INVENTION

Electronic communications via computer networks are replacing traditional modes of communication including printed media and voice communication. One form of computer network communication, known as Electronic Data Interchange (EDI), is becoming a standard format for exchanging information within a business. However, the use of network communications such as EDI as a means for communicating between separate business entities has not received widespread acceptance because of the independent nature of the computer networks of separate business entities.

Computer networks have also been used within a business to implement various quantitative analysis techniques such as Critical Path Method (CPM) scheduling, Project Evaluation and Review Technique (PERT) and Material Requirement Planning (MRP). These tools are used to increase the efficiency of business operations and to coordinate work flow within a business. For example, U.S. Pat. No. 5,233,533 to Edstrom et al. describes scheduling software for optimizing the scheduling of resources in a factory setting. U.S. Pat. No. 4,937,743 to Rassman et al., describes a method for the dynamic management of a project involving multiple interrelated resources, such as the use of facilities and equipment within a business entity. Unfortunately, the independent nature of many computer networks and the programs designed to run on these computer systems, has made the coordination of schedules between separate business entities difficult. Consequently, computer systems have often not been used to facilitate the scheduling of interrelated operations of individual business entities across an entire industry.

Product information is often transmitted by manufacturers to distributors in an electronic format. Because product distributors typically sell products from multiple manufacturers, each distributor typically develops its own catalog of products using the information provided by the various manufacturers. As a result, updated product information received from a manufacturer is not easily or promptly forwarded to retailers and others who purchase products from distributors because the distributor must update its catalog.

SUMMARY OF THE INVENTION

It is therefore an object of the present invention to facilitate communication and information exchange between independent business entities.

It is another object of the present invention to facilitate the coordination of schedules of individual business entities within an industry.

It is another object of the present invention to facilitate prompt dissemination of product information from manufacturers to others downstream in the distribution chain.

The present invention includes systems, methods, and computer program products for synchronizing fabrication schedules and supplier schedules. A fabrication schedule includes a plurality of sequential work stages which are stored on a fabricator data processing system. Supplier schedules include a plurality of schedules for the sequential work stages within a fabrication schedule. Supplier schedules may be stored on supplier data processing systems. A fabrication schedule is obtained from a fabricator data processing system, and supplier schedules are obtained from respective supplier data processing systems. Restrictive links are established between the fabrication schedule and the supplier schedules. Each restrictive link defines the supplier that will perform a work stage, and may also define the starting and ending times for both fabrication and supplier schedules.

When a change in at least one of the sequential work stages is obtained from the fabricator or from the selected one of the suppliers, the restrictive links are automatically modified in response to the obtained change. The modified fabrication schedule and/or the modified supplier schedule is communicated to the fabricator data processing system or to the supplier data processing system. If a restrictive link cannot be modified in response to an obtained change, an error message may be returned. Furthermore, if a supplier is not able to supply a particular work stage, a second supplier may be automatically selected.

The present invention facilitates synchronizing relevant portions of a product fabricator's schedules with the various schedules of suppliers of materials, labor, and the like. The present invention also facilitates the synchronization of accounting and billing systems, access to product-related information, access to legislative and regulatory information, and access to on-line catalogs and ordering systems for various materials.

According to another aspect of the present invention, a scheduling method is provided for reducing the time to complete a critical path schedule when completion of at least one of the activities in the critical path is delayed. A schedule having interrelated activities forming a critical path is stored in a data processing system. A float time preceding a selected activity starting time is assigned and utilized to absorb delays in completing activities preceding the selected activity. A revised schedule may be generated in the data processing system based upon the absorbed delays. Float time may be assigned to multiple selected activities.

According to another aspect of the present invention, a computer based product catalog system is provided for automatically distributing product information. Electronically stored catalogs of multiple manufacturers' products, including descriptions of the products, are provided. An electronically stored distributor catalog, including selected products from the various manufacturers is also provided. Descriptions of the products in the manufacturers' catalogs may be updated automatically. In response to the updating of the manufacturers' catalogs, the descriptions of the products in the distributor's catalog may be automatically updated. A terminal located at the retail level of distribution may be operatively connected to the manufacturers' catalogs and to the distributor catalog to allow viewing of product information therewithin. The terminal may enable users to order products from a manufacturer's and distributor's catalog.

The present invention is advantageous because it facilitates the coordination and flow of information between separate business entities within an industry. In particular, schedules of separate business entities can be synchronized to establish efficiencies across the industry. The present invention enhances the flow of information among businesses without disrupting the autonomy of each business. Furthermore, the present invention allows information to flow between the members of an industry without interfering with the established channels of trade and business relationships.

DETAILED DESCRIPTION OF PREFERRED EMBODIMENTS

Figure 1:
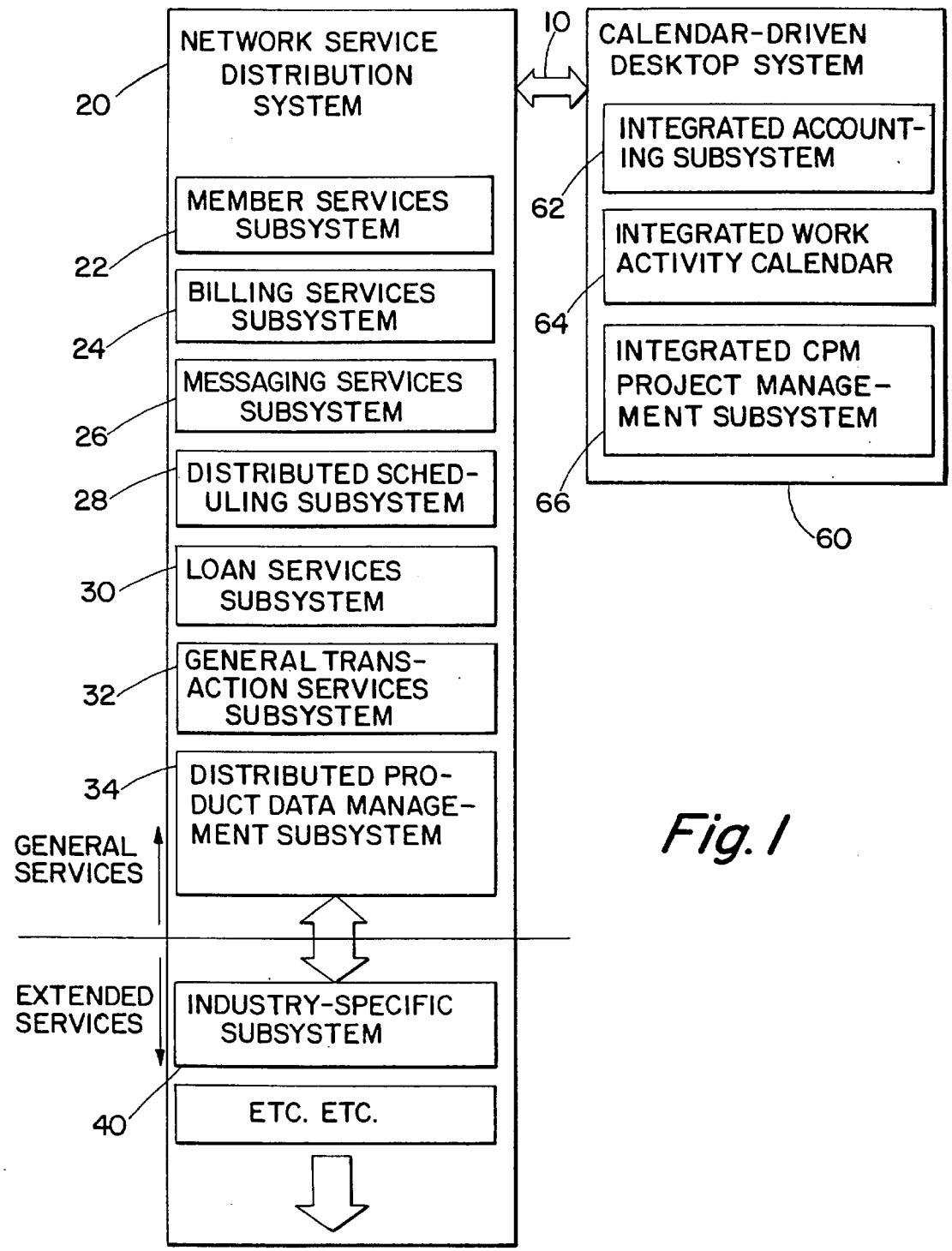
FIG. 1 illustrates a Network Service Distribution System and a Calendar-Driven Desktop System for synchronizing schedules and exchanging information between separate business entities, according to the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

According to one aspect of the present invention, a computer network system having a dynamic scheduling system for integrating schedules of separate business entities within an industry is disclosed. The present invention leaves the independence and management of individual business entities intact, yet allows the whole industry to work as a single, efficient organization. Utilizing the present invention, a business entity may view and interact with information of other members of an entire industry. Each business continues to compete with other businesses in the industry, yet scheduling of activities, project management and exchange of information necessary for the whole industry to function can become organized and efficient via the present electronic computer network system. To facilitate scheduling and project management across an entire industry, the present invention utilizes and enhances known scheduling techniques including Critical Path Method (CPM) to allow each network member to maintain individual schedules yet synchronize relevant portions of these schedules with the schedules of other industry members.

Using the home building industry as an illustrative example, the present invention facilitates synchronizing relevant portions of a home builder's schedules with the various schedules of vendors, suppliers, manufacturers, financial institutions, and the like. The present invention also facilitates the synchronization of accounting and billing systems, access to home building-related information, access to legislative and regulatory information, and access to on-line catalogs and ordering systems for materials, fixtures, and the like.

For each individual house being fabricated by a home builder, the home builder typically will develop a fabrication schedule which includes a sequential listing of all activities or work stages related to the completion and sale of the house. For example, work stages may include, but are not limited to, grading the lot upon which a house is to be built, digging the foundation, pouring the footings upon which the house rests, framing the structure, placing a roof over the framing, covering the framing with sheathing, laying up brick veneer, and finishing the inside of the house. Each of these work stages will typically be assigned starting times and will be sequentially arranged so that the house is built in the shortest amount of time. As is known to those having skill in the art, some work stages may occur substantially concurrently, while others require the completion of a preceding work stage before they can occur.

The home builder will typically enter into a relationship or contract with another party, such as a sub-contractor or material supplier to perform the work and/or deliver materials for each of these work stages. In either case, the contracting party is a supplier of either labor or materials or both. Each contract between the home builder and a supplier of labor/materials typically includes a time of performance on the part of the supplier. That is, each contract will restrictively link the supplier's schedule of performance to the home builder's schedule for a particular house. Because most suppliers of labor/materials are supplying labor/materials for multiple houses and projects, it is important that a home builder's schedule for a particular house be synchronized with a supplier's schedule. In particular, it is important for a home builder to know that if a work stage starting date is changed for some reason, the supplier supplying labor/materials for that work stage either can or cannot perform under the contract. If the supplier cannot perform because of its schedules related to other projects, the home builder must secure a contract with another supplier.

An exemplary work stage during the construction of a house is the framing of the house structure. A home builder will typically locate a particular supplier (i.e. a framing crew) to begin and complete the framing work stage within a given time period. For example, assume that framing of a particular house is slated to take twenty days beginning on January 1. The home builder enters into a contract with framing crew A to begin framing on January 1 and complete framing no later than January 21. Typically, the contract or restrictive link between the home builder and framing crew A will include some reasonable time range in which the starting date of framing can vary, such as plus or minus three days. Thus, if the foundation work, which must be completed prior to framing, is not completed until January 2, the home builder knows that framing crew A can still perform. However, if the foundation work is not completed until January 18, the contract between the home builder and framing crew A is no longer valid and the home builder must either ask framing crew A if it can still perform, or the home builder must look for another framing crew.

The above scenario is often repeated in the home building industry and other fabrication industries many times during a single project. The home builder or other product fabricator typically spends a lot of time securing contracts with suppliers of labor/materials, both at the beginning of a fabrication schedule and throughout the schedule as the starting and ending times of the various work stages are changed. The present invention facilitates establishing contracts or restrictive links between product fabricators, such as home builders, and suppliers of labor and/or materials. The present invention also facilitates the automatic synchronization of a fabricator's schedule for a particular project or product with the schedules of many suppliers of labor and/or materials as changes occur to either the fabricator's schedule or a supplier's schedule or both. The present invention also facilitates rescinding a contract between a fabricator and a supplier when the rescinded contract does not permit a particular change to either the fabrication schedule or the supplier's schedule, and facilitates the establishment of a replacement contract between the fabricator and another supplier. The present invention may be utilized in a variety of industries and is not limited to the home building industry.

A preferred computer network system for carrying out methods of synchronizing a fabrication schedule with a plurality of supplier schedules, according to the present invention, is a dynamic system wherein schedule changes made by a network member ripple down to all network members and are automatically integrated within the schedule of each respective network member as appropriate. For example, if rain delays the framing of a house, the lumber yard's delivery schedule will be updated automatically to deliver lumber on a new date specified in the home builder's schedule. The present invention permits such changes to be made remotely through the use of various input devices, including personal data assistants and other computer terminals in communication with a central data processing system.

Referring now to FIG. 1, a computer network system 10 for synchronizing schedules and facilitating the flow of information between multiple business entities within an industry, according to a preferred embodiment of the present invention, is illustrated. In the illustrated embodiment, the computer network system 10 includes a centrally-located Network Service Distribution System 20 and a plurality of Calendar-Driven Desktop Systems 60, each in communication with the Network Service Distribution System. Each Calendar-Driven Desktop System 60 is the user interface members of the computer network system 10 use to communicate and exchange information with other network members via the Network Service Distribution System 20. The Network Service Distribution System 20 and each Calendar-Driven Desktop System 60 contain subsystems that are described in detail below.

Network Service Distribution System

The Network Service Distribution System 20 contains the following subsystems that may apply generally to any industry: Member Services Subsystem 22, Billing Services Subsystem 24, Messaging Services Subsystem 26, Distributed Scheduling Subsystem 28, Loan Services Subsystem 30, General Transaction Services Subsystem 32, Distributed Product Data Management Subsystem 34, and a Consumer Product or Service Marketing Subsystem (not shown). These subsystems can be categorized as general services, as illustrated, because they are typically useful and important to any industry. In addition, one or more, industry-specific subsystems 40 can be added as necessary. Industry-specific subsystems 40 can be categorized as extended services, as illustrated, because they are typically unique to a particular industry.

The Member Services Subsystem 22 and the Billing Services Subsystem 24 are used to maintain information about network members. The term "network members" shall mean business entities within an industry that have access to the computer network system 10 illustrated in FIG. 1, or a computer network system capable of carrying out the methods of the present invention. It is contemplated by the present invention that each network member is a distinct and separate business entity within a particular industry. The Member Services Subsystem 22 preferably maintains the list of network members and validates the identity of a user in communication with the Network Service Distribution System 20. The Billing Services Subsystem 24 preferably tracks the usage of the Network Service Distribution System 20 for each network member and generates billing information for each network member. The Messaging Services Subsystem 26 is used to store and forward electronic mail and other asynchronous message types between network members. Preferably, various publications and discussion forums are accessible by network members via the Messaging Services Subsystem 26. Also, gateways are preferably provided to the Internet and other electronic networks for inter-industry information exchange. The Distributed Scheduling Subsystem 28, described in greater detail below allows each network member to integrate its schedules within the schedules of other network members.

The Loan Services Subsystem 30 facilitates access to financial services for network members and their customers. Preferably, communication with major financial institutions is available via the Loan Service Subsystem 30. The General Transaction Services Subsystem 32 facilitates a store and forward process for standardized messages that routinely travel between network members in the course of conducting commerce. Exemplary messages include standardized accounting messages and standardized project management messages. Preferably, all messages passing through are stored for audit trail purposes. The Distributed Product Data Management Subsystem 34 makes available electronically recorded product information to distributors, retailers, and consumers. The Consumer Product or Service Marketing Subsystem (not shown) connects network members with consumers and facilitates "on-line" shopping.

The Network Service Distribution System 20 and its illustrated subsystems may serve as a means for: obtaining a fabrication schedule from a fabricator's data processing system; obtaining supplier schedules from respective supplier data processing systems; automatically selecting a supplier from a plurality of suppliers; and communicating a selection to the supplier system which corresponds to the selected supplier. The Network Service Distribution System 20 may also include a fabricator data processing system for storing fabrication schedules which include multiple work stages arranged sequentially. The Network Service Distribution System 20 may also include a plurality of supplier data processing systems for storing a schedule for each sequential work stage performed by a particular supplier.

Calendar-Driven Desktop System

The Calendar-Driven Desktop System 60 provides the network interface for communications with the Network Service Distribution System 20 and with other network members. It also provides users with a calendar of tasks and work stages needed for carrying out the operations of a network member's business. Standardized messages from the General Transaction Services Subsystem 32 can automatically produce intelligent calendar entries. These calendar entries may be employed to launch applications when selected, or they can automatically launch on a given date. Calendar entries can likewise be used to send standardized messages back to the General Transaction Services Subsystem or can send them automatically 32.

Using the home building industry as an example, when it is time to order supplies for a given work stage of a project, a calendar entry created by a project management or project planning application can automatically place the order. Calendar entries can also automatically confirm that an order will be delivered on time. Recurring calendar entries can be used to launch recurring applications or functions appropriate for a network member's business. Calendar entries may be used to integrate project management, integrate work activity calendars, and integrate accounting. For project management, calendar entries can issue purchase orders and bid requests, or ask for confirmation regarding material delivery. For accounting, calendar entries can be used to send and receive invoices. Any subsystem application can be written under the Calendar-Driven Desktop System 60 to provide that particular application with industry-wide communication through the Network Service Distribution System 20 utilizing a standardized application programming interface (API).

In the illustrated embodiment of FIG. 1, the Calendar-Driven Desktop System 60 includes the following: Integrated Accounting Subsystem 62, Integrated Work Activity Calendar 64, and Integrated Project Management Subsystem 66. The Calendar-Driven Desktop System 60 receives and sends messages between network members and the various subsystems within the Network Service Distribution System 20. Each message is received and distributed within the Calendar-Driven Desktop 60 according to the subsystem or program application most appropriate to its purpose. For example, messages from the General Transaction Services Subsystem 32 arrive as stages of work or tasks linked to the Integrated Accounting Subsystem 62. These messages appear as calendar entries requiring attention by a network member. Preferably, calendar entries are automatically entered and adjusted by the Integrated Accounting Subsystem 62 and Integrated Project Management Subsystem 66. Calendar entries or messages from the General Transaction Services Subsystem 32 may automatically launch appropriate applications associated with completing or resolving the specific type of standardized message.

The Calendar-Driven Desktop System 60, and its illustrated subsystems, may serve as a means for: obtaining a fabrication schedule from a fabricator's data processing system; obtaining supplier schedules from respective supplier data processing systems; automatically selecting a supplier from a plurality of suppliers; and communicating a selection to the supplier system which corresponds to the selected supplier. The Calendar-Driven Desktop System 60 may also include a fabricator data processing system for storing fabrication schedules which include multiple work stages arranged sequentially. The Calendar-Driven Desktop System 60 may also include a plurality of supplier data processing systems for storing a schedule for each sequential work stage performed by a particular supplier.

The Integrated Project Management Subsystem 66 is a network member's interface with the Network Service Distribution System 20 for fabrication and supplier project schedules, such as CPM schedules. Using the home building industry as an example, a home builder may use the Integrated Project Management Subsystem 66 to obtain, modify, and communicate to suppliers its fabrication schedule. Similarly, each supplier of labor and/or materials may use the Integrated Project Management Subsystem 66 to obtain, modify, and communicate its schedules. The Integrated Work Activity Calendar 64 is a network member's interface with the Network Service Distribution System 20 for work activity calendar schedules. The Integrated Project Management system 66 and the Integrated Work Activity Calendar 64 can both generate bid requests to other network members via the General Transaction Services Subsystem 32 for the purpose of establishing contracts between network members. If bid requests are accepted, contracts can be established using the General Transaction Services Subsystem 32. Once a contract is established, the Distributed Scheduling Subsystem 28 may serve as a means for establishing restrictive links between the schedules of the contracting parties. Network members may utilize the Calendar-Division Desktop System 60 on an on-going basis to monitor and update work progress on particular projects. When network members indicate that a work stage or task is complete, the restrictive link may be removed by the Distributed Scheduling Subsystem 28.

An Integrated Accounting Subsystem 62 is preferably integrated with project management and work activity schedules of a network member such that accounting information is automatically obtained without redundant data entry. Distributed scheduling and project management, along with the General Transaction Services Subsystem 32, allows the Integrated Accounting Subsystem 62 of the Calendar-Driven Desktop System 60 to function with little or no data entry. Accordingly, the majority of normal functions required for bookkeeping, such as invoice entry, may be eliminated.

The Integrated Work Activity Calendar Subsystem 64 is used by suppliers who enter into contracts with other network members to supply labor and/or materials for a work stage of a fabrication schedule. The Integrated Work Activity Calendar Subsystem 64 facilitates receiving bid requests for the supply of labor and/or materials from network members and is designed to automatically accept or reject bid requests, depending on the nature of the bid requests and also depending on the availability of time in a network member's schedule. Advantageously, since schedules are maintained by the Distributed Scheduling Subsystem 28, a network member does not have to be in continuous communication with the computer network system 10. A network member can, instead, periodically dial-in and connect to the Network Service Distribution System 20 using a personal computer and modem, including a small portable computer with a cellular modem.

The Integrated Work Activity Calendar Subsystem 64 may serve as a means for obtaining fabrication schedules and supplier schedules from the Distributed Scheduling Subsystem 28. If changes are made to a schedule, the Distributed Scheduling Subsystem 28 may serve as a means for obtaining the change and for automatically modifying a restrictive link associated with the change. If the restrictive link may not be modified because of schedule conflicts or for other reasons, an error message is returned. A network member has the option of canceling a contract with another network member, which deletes any restrictive links associated with the contract and sends a message to the affected network members, via the General Transaction Services Subsystem 32, indicating that a contract has been canceled. When an Integrated Project Management Subsystem 66 receives such a message it attempts to automatically handle the scheduling conflict. It issues bid requests to try and re-establish the contract with the same network member at a different time. If this fails within the preceding float range allowed for the conflicted work stage, the Integrated Project Management Subsystem 66 then issues bid requests to other network members. Unresolved scheduling conflicts preferably generate notifications to affected network members.

Schedule Synchronization Between Network Members

Typically each member of the computer network system 10 is a separate business entity within an industry and has one or more work schedules. Generally, there are two types of work schedules: CPM schedules, and work activity calendar schedules. A work activity calendar schedule is simply a schedule of appointments. It is similar like the notebook of scheduled activities that a businessman maintains. A CPM schedule is a sequential arrangement of work stages, some of which may not begin until previous ones have been completed. Individual tasks can be work stages in both types of schedules. Restrictive links can be established between either of these two types of schedules. Work stages within a schedule may have restrictions placed on them by their owners to indicate how far the starting and ending times of the work stage can vary.

A work stage is a step in the fabrication of a product and has a time duration defined by a starting time and an ending time. As used herein, the terms "time(s)" and "date(s)" shall have the same meaning and shall be interchangeable. Schedules can be at different scales, with more detailed schedules inside of lesser detailed schedules. For example: a schedule of new office construction in a business park—office one must be completed before office two can begin, and so forth. Each office project can have a detailed schedule of events required to complete its construction. Thus, the detailed schedule is a "child" of the lesser detailed "parent." Preferably, work stages cannot be linked to work stages shared between parent and child projects. For example, if work stage A is part of a project which is contained in work stage B, then no work stage that is in the same project as work stage B may be linked to work stage A, as this would cause a circular dependency. With this restriction in place, the system can allow for entire projects within a single work stage.

In the illustrated embodiment, the Distributed Scheduling Subsystem 26 automatically updates interrelated schedules of network members and allows each network member to make changes to its schedules in consideration of up-to-date knowledge about the status of the schedules of other network members. Preferably, the Distributed Scheduling Subsystem 26 utilizes enhanced CPM scheduling techniques which permit restrictions and relationships to be established between a broad range of work stages and project scales, each able to be restricted by the other, regardless of the scale of a stage of work. For example, a set of work stages that define a project can be considered as a single work stage that is related to or restricted by, one or more other work stages, jobs, large-scale projects, and the like. Similarly, a collection of jobs that make up a large scale project may be considered a single work stage that is related to or restricted by a work stage, a job, a large-scale project, and the like. Preferably, the Distributed Scheduling Subsystem 28 stores the various fabrication and supplier schedules of network members within one or more databases.

Figure 4:
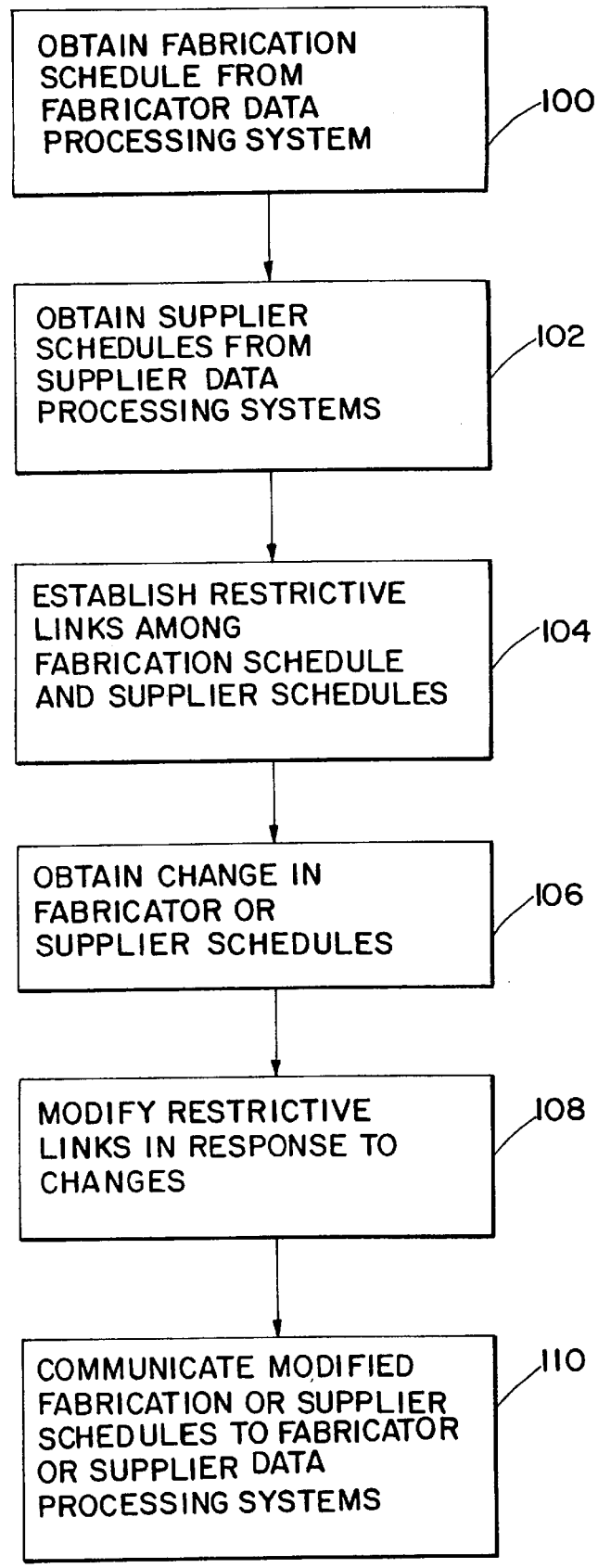
FIG. 4 schematically illustrates a method of synchronizing a fabrication schedule and a plurality of supplier schedules, according to the present invention.

Referring now to FIG. 4, a method of synchronizing a fabrication schedule and a plurality of supplier schedules, according to the present invention, is illustrated. Steps include: obtaining a fabrication schedule from a fabricator data processing system (Block 100); obtaining supplier schedules from respective supplier data processing systems (Block 102); establishing restrictive links among a fabrication schedule and supplier schedules (Block 104); obtaining a change in a fabrication schedule work stage (Block 106); automatically modifying restrictive links in response to an obtained change (Block 108); and communicating a modified fabrication or supplier schedule to a fabricator data processing system or to a supplier data processing system (Block 110).

The illustrated method is preferably recursive such that it calls itself for the purpose of determining whether changes are necessary to other schedules of network members when a given schedule has a changed time. When the starting time of a restrictively linked work stage is changed, and nothing prevents the work stage on the other end of the restrictive link from changing its starting or ending time, the Distributed Scheduling Subsystem 28 automatically modifies the restrictive link in response to the starting time change. In the illustrated embodiment, the Distributed Scheduling Subsystem 28 handles the process of checking whether work stages restrictively linked can be rescheduled. Each restrictive link contains information about the range of time within which a work stage starting or ending time can be changed. If a work stage cannot be automatically rescheduled, the changes are not made and a conflict error is returned to network members affected by the conflict.

If scheduling conflicts cannot be resolved by rescheduling, the present invention is designed to attempt to reschedule with another network member from a predetermined list of alternates. For example, if a home builder's fabrication schedule has a work stage for framing with a starting time that has slipped such that a restrictively linked framing crew A cannot perform the work, the present invention will attempt to establish a contract between the home builder and another framing crew on that home builder's list of approved framing crews. The present invention may attempt to resolve scheduling conflicts by delaying the starting times of restrictively linked schedules. If this is unsuccessful, alternative resolutions may be pursued.

Figure 5A:
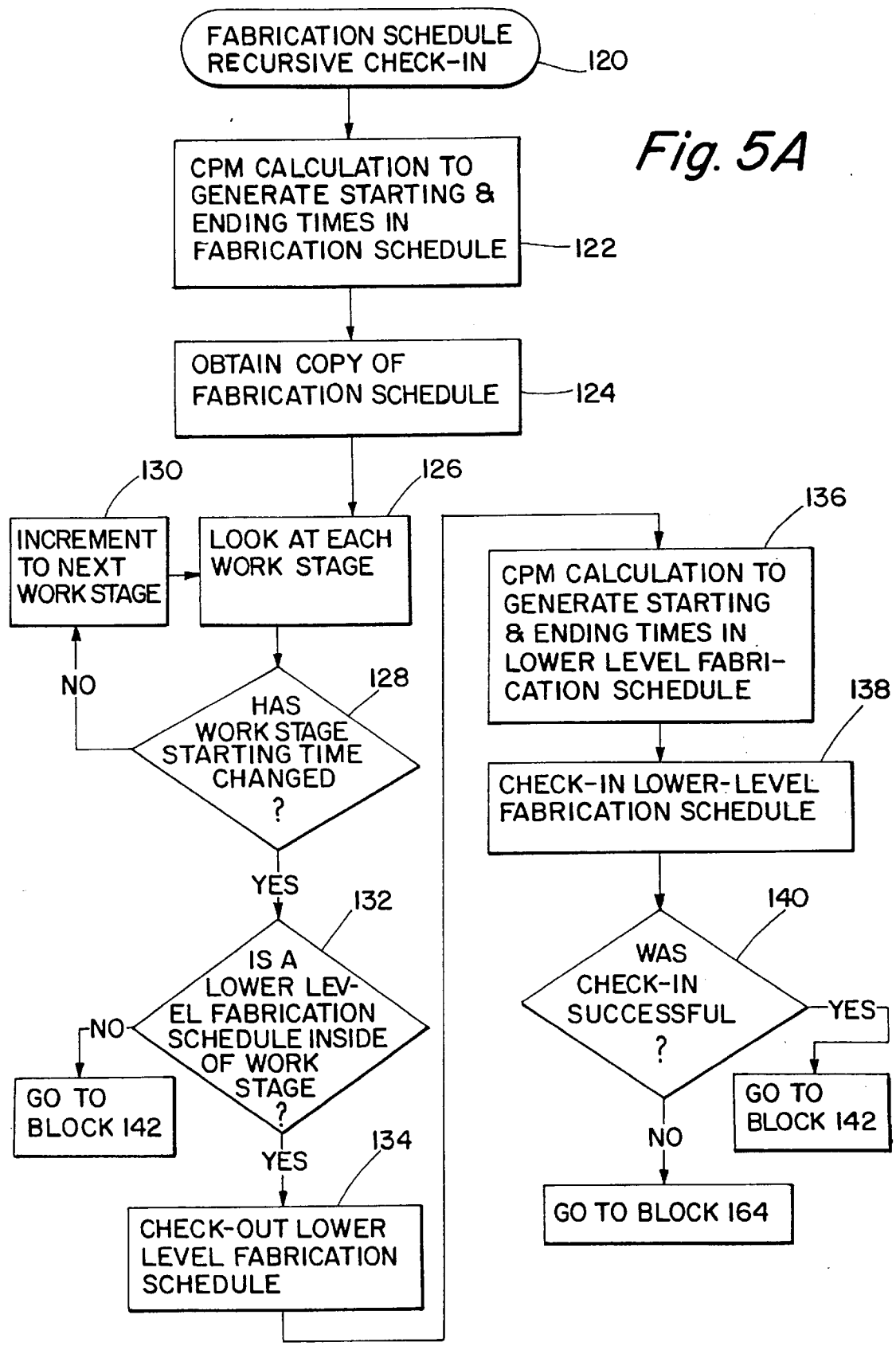
FIGS. 5A, 5B, 5C schematically illustrate in greater detail a method of synchronizing a fabrication schedule and a plurality of supplier schedules.
Figure 5B:
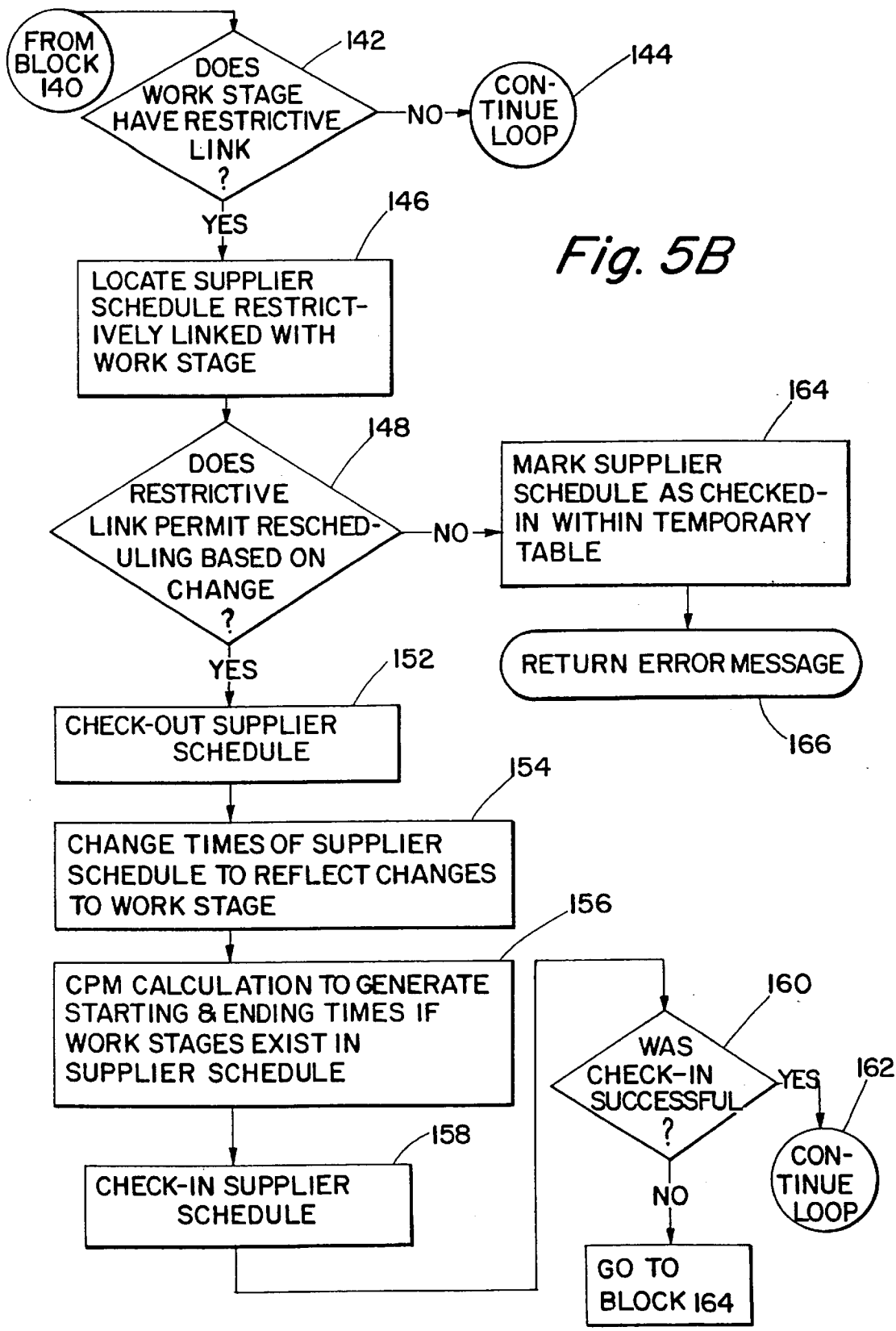
Figure 5C:
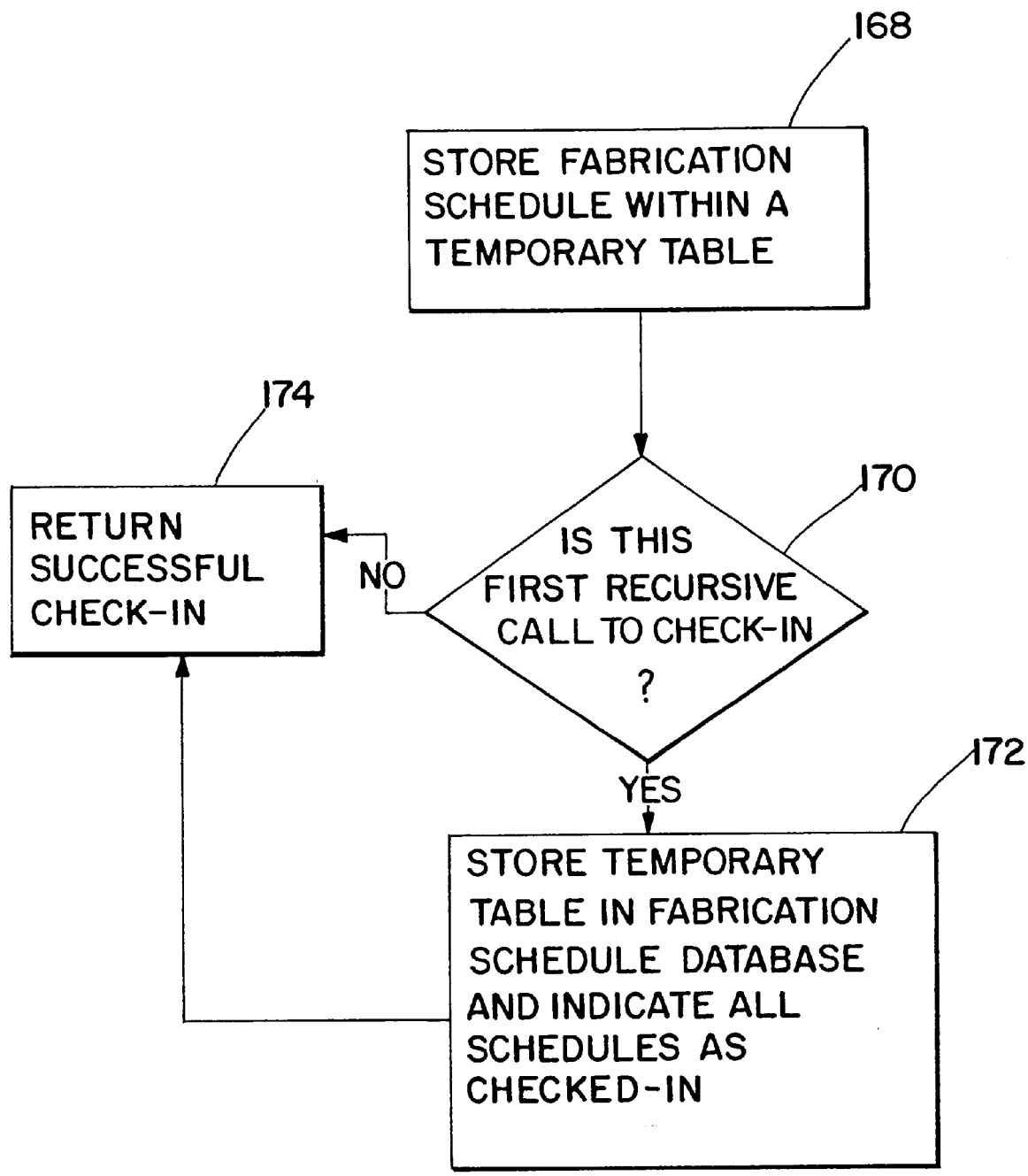

FIGS. 5A, 5B, 5C are flow diagrams, illustrating a recursive method of synchronizing a fabrication schedule and a plurality of supplier schedules, according to one embodiment of the present invention, when a change is made to the fabrication schedule. To make modifications to an existing fabrication schedule, a network member (fabricator) "checks out" or obtains a copy of the fabrication schedule from the Distributed Scheduling Subsystem 28, makes the changes to the fabrication schedule, and attempts to synchronize the modified fabrication schedule with other supplier schedules. Referring now to FIG. 5A, for each fabrication schedule stored (or to be stored) within the Distributed Scheduling Subsystem 28, a CPM calculation method is performed to generate starting and ending dates of all work stages within the fabrication schedule (Block 122). This may be performed either locally via a Calendar-Driven Desktop System 60, or centrally via a Network Service Distribution System 20. For existing fabrication schedules that are being checked into the Distributed Scheduling Subsystem 28, a copy of the fabrication schedule, as it existed when it was checked out from the Distributed Scheduling Subsystem, is obtained (Block 124).

When a modified or new fabrication schedule is checked-in with the Distributed Scheduling Subsystem 28, the pre-existing starting and ending times of all work stages are compared with those of the fabrication schedule to identify any changes. This is illustrated as an iterative loop (Block 126–Block 130) in FIG. 5A. If any work stage starting times are changed, several steps are then performed. First, a work stage having a changed starting or ending time is checked to see if a lower level fabrication schedule is contained within the work stage with the changed starting or ending times (Block 132). If there is a lower level fabrication schedule associated with a work stage having changed starting or ending times, then the lower-level fabrication schedule is recursively checked-out (Block 134). If the overall starting time (i.e., the starting time of the first work stage in the schedule) of the lower-level fabrication schedule has been changed, a CPM calculation is performed to generate new starting and ending times for each work stage (Block 136) within the lower-level fabrication schedule. The lower-level fabrication schedule is then recursively checked back in (Block 138). The recursive check-in allows for a continuous comparison of work stage starting times with original starting times. Next, a determination is made whether the lower-level fabrication schedule has been successfully checked in without any errors (Block 140). If the answer is yes, the procedure proceeds to Block 142, otherwise, the procedure proceeds to Block 164.

Referring now to FIG. 5B, after lower-level fabrication schedules have been modified and recursively checked, where necessary, a fabrication schedule work stage having a changed starting or ending time is checked for a restrictive link with a supplier schedule (Block 142). If no restrictive link exists for the changed work stage, the procedure continues in an iterative loop to the next work stage having a changed starting or ending time and checks for any restrictive links thereto (Block 144). If no restrictive links are found for any work stages having changed starting or ending times, the procedure terminates, and the fabrication schedule is checked in. When no restrictive links exist between work stages of a fabrication schedule that have been changed and supplier schedules, any changes made to the fabrication schedule have no impact on the supplier schedules.

If a fabrication schedule work stage with a changed starting or ending date is restrictively linked to a supplier schedule, this supplier schedule is located (Block 146). A determination is made whether the restrictively linked supplier schedule can be changed in accordance with the change to the work stage at the other end of the restrictive link (Block 148). If the supplier schedule can be rescheduled, the supplier schedule is checked-out by the Distributed Scheduling Subsystem 28 (Block 152), and the supplier schedule is changed accordingly (Block 154). If the supplier schedule contains work stages sequentially arranged, a CPM calculation is performed to generate starting and ending times (Block 156). The supplier schedule is then recursively checked-in with the Distributed Scheduling Subsystem 28 (Block 158). If check-in is successful (Block 160), the recursive procedure continues to the next fabrication schedule work stage with a changed starting or ending time (Block 162) and the above-described procedure is repeated. If check-in is not successful, the procedure proceeds to Block 164.

During the recursive procedure described above, if any schedule changes are not allowed, a conflict error message is returned to the appropriate subsystem within the affected network member's Calendar-Driven Desktop System 60 and no schedule changes are made. Database updates for schedule check-ins are delayed until the recursive procedure is complete. When the procedure is complete, all stored schedules are updated. If an unsuccessful check-in of a supplier schedule has occurred (Block 160) or if a restrictive link does not allow a supplier schedule to change (Block 148), the supplier schedule is marked within a temporary table as checked-in (Block 164) and an error message is returned (Block 166).

Referring now to FIG. 5C, when the iterative loop defined by Block 126–Block 130 is complete, the fabrication schedule is stored within a temporary table (Block 168). A determination is made whether this is the first recursive call to check-in (Block 170). If the answer is yes, the temporary table is stored within the fabrication schedule database and all schedules are indicated as checked-in (Block 172). If the answer is no, a message of successful check-in is returned (Block 174).

The above-described recursive procedure is applicable to all schedules, including fabrication and supplier, that are changed and which are restrictively linked with other schedules. The present invention preferably includes additional features such as when a threshold amount of computer storage space is exceeded by changed schedules. If such a threshold is exceeded, an error message is produced. Additionally, if an attempt is made to check-out a schedule that is already waiting to be updated by the same recursive procedure, an error message is returned. If an attempt is made to check-out a schedule that is waiting to be updated by another recursive procedure, the system waits until that recursive procedure is completed.

It will be understood by those having skill in the art that one or more of the steps set forth in the flow charts of FIGS. 4 and 5A, 5B, 5C may be implemented using computer readable program code, embodied within computer usable media, executing on a general purpose computing system, on a special purpose computing system, or on a combination thereof. It will also be understood that, for the flow charts set forth in FIGS. 4 and 5A, 5B, 5C, each block, and combinations thereof, may be implemented by computer program instructions. These computer program instructions may be loaded into a computer or other programmable apparatus to produce a machine, such that the instructions which execute on the computer or other programmable apparatus create means for implementing the functions specified in the flow chart block or blocks.

The computer program instructions may also be stored in computer readable media (including magnetic media, optical media, read only memory, random access memory, and the like) that can direct a computer or other programmable apparatus to function in a particular manner, such that the instructions stored in the computer readable media produce an article of manufacture including instruction means which implement the function specified in a flow chart block or blocks. The computer program instructions may also be loaded into a computer or other programmable apparatus to cause a series of operational steps to be performed on the computer or other programmable apparatus to produce a computer implemented process such that the instructions which execute on the computer or other programmable apparatus provide steps for implementing the functions specified in a flow chart block or blocks.

According to another aspect of the illustrated embodiment in FIG. 1, the Integrated Project Management Subsystem 66 may be constantly updated with work progress by network members. The term "work progress" includes expected work stage completion times and actual work stage completion times. When work progress shows that a work stage ending time is expected to be delayed, the Integrated Project Management Subsystem 66 may check-out the fabrication schedule, update work stage starting and/or ending times accordingly, and perform a CPM calculation to generate starting and ending times for all work stages in the fabrication schedule. The Integrated Project Management Subsystem 66 may then attempt to check-in the fabrication schedule into the Distributed Scheduling Subsystem 28. Depending on the existence of restrictive links, this operation may succeed or fail. If it fails, the Integrated Project Management Subsystem 66 may receive a list of conflicting restrictive links from the Distributed Scheduling Subsystem 28 which are used to develop solutions to the scheduling conflict(s). Depending on the nature of a particular project or work stage, the Integrated Project Management Subsystem 66 may cancel the originally scheduled process or relationship with a supplier and establish a new one with another network member supplier. The Integrated Project Management Subsystem 66 may also force a delay on a work stage starting time, re-compute the fabrication schedule, and attempt to check-in the fabrication schedule with the Distributed Scheduling Subsystem 28. According to one aspect of the present invention, the Integrated Project Manager Subsystem 66 may be designed to automatically track fabrication and supplier schedules of network members and keep them synchronized or find solutions when scheduling conflicts arise.

Home Building Industry Example 1

In the home building industry, a home builder typically has several projects (houses) under construction and others that are about to start. Each project has a fabrication schedule with multiple, sequentially arranged work stages stored in a Distributed Scheduling Subsystem 28. As the home builder enters into contracts for materials and labor for each work stage, restrictive links are established among the fabrication schedule and the multiple supplier schedules. The process of forming contracts with other network member suppliers is preferably performed via the General Transaction Services Subsystem 32. When a contract is formed between the home builder and a supplier, the Integrated Project Management Subsystem 66 "checks-out" the home builder's fabrication schedule for this project. Preferably, at about the same time, the Integrated Work Activity Calendar 64 for the home builder checks-out the activity calendar for the subcontractor/supplier. Both systems (the Integrated Project Management Subsystem 66 and Integrated Work Activity Calendar 64) indicate that a restrictive link has been established between at least one work stage in the fabrication schedule and a supplier schedule, per the established contract. Both systems (the Integrated Project Management Subsystem 66 and Integrated Work Activity Calendar 64) check-in the restrictively linked fabrication and supplier schedules. Preferably, the Distributed Scheduling Subsystem 28 recognizes restrictive link indicators and establishes actual restrictive links between the respective schedules.

Preferably, work progress is recorded into the Integrated Project Management Subsystem 66 which calculates the starting and ending times of the fabrication schedule work stages using CPM calculation methods. The fabrication schedule is checked-in and a changed starting time for a work stage is identified. The home builder's Work Activity Calendar is contacted to see if the time change can be accommodated. If yes, the starting time change is made. If no, the check-in fails and an error message is returned to the Integrated Project Management Subsystem 66 of the home builder.

Assigning Float Time to Work Stages Within a Critical Path Schedule

A critical path schedule includes a sequential arrangement of work stages, some of which cannot be performed until a prior one is performed. If a starting time is known for a given schedule, the starting and ending times for each work stage in the schedule can be computed utilizing various CPM calculation methods known to those having skill in the art. A delay to one work stage in a critical path will have a cascade effect on the schedule such that for each day a work stage is delayed, a delay to the entire schedule results. Work stages that are not on the critical path are considered to have float. A work stage with three days float can exceed its scheduled duration by three days without affecting the overall schedule.

Figure 2A:
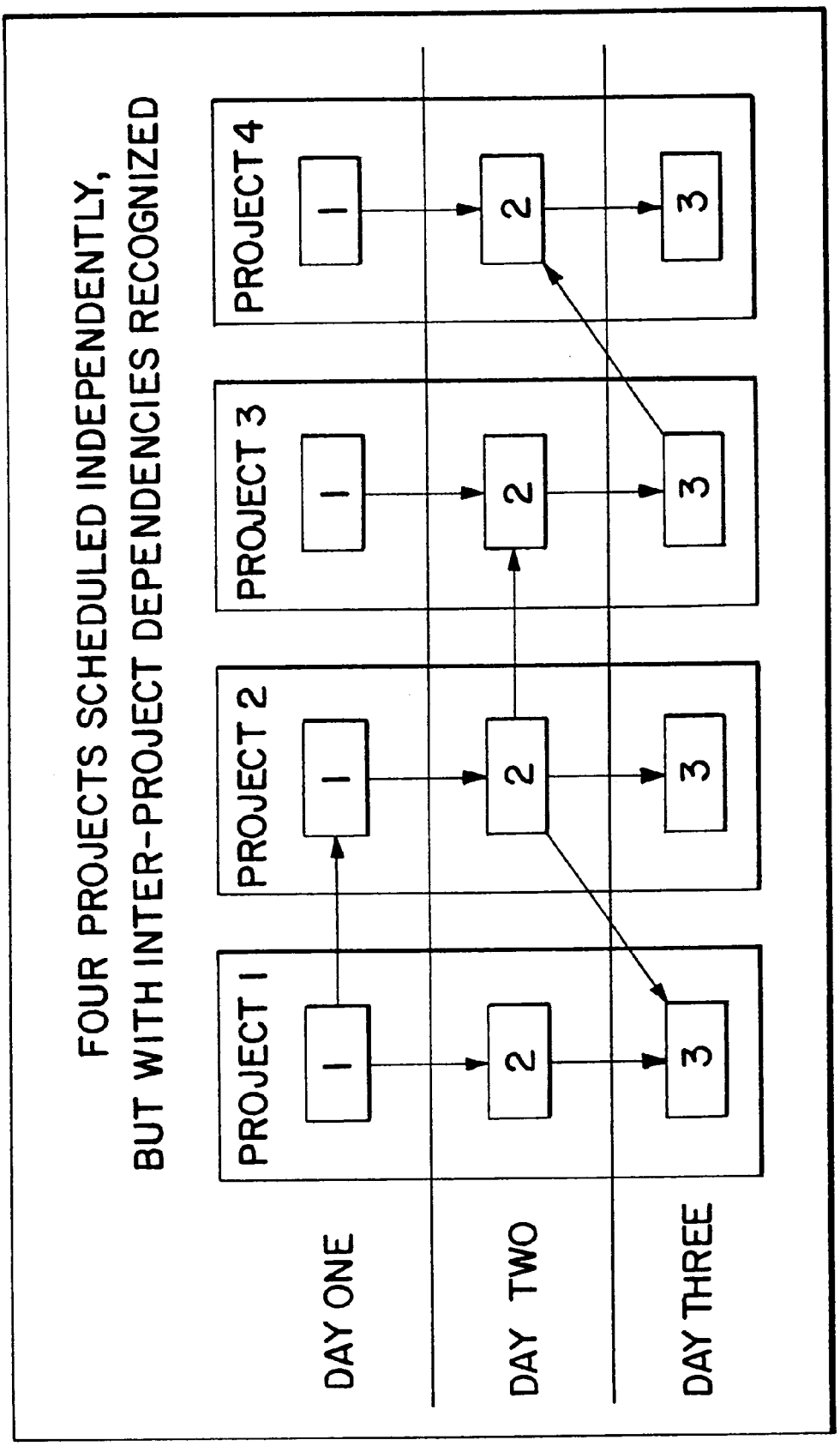
FIGS. 2A, 2B, 2C illustrate the interdependencies of multiple projects.
Figure 2B:
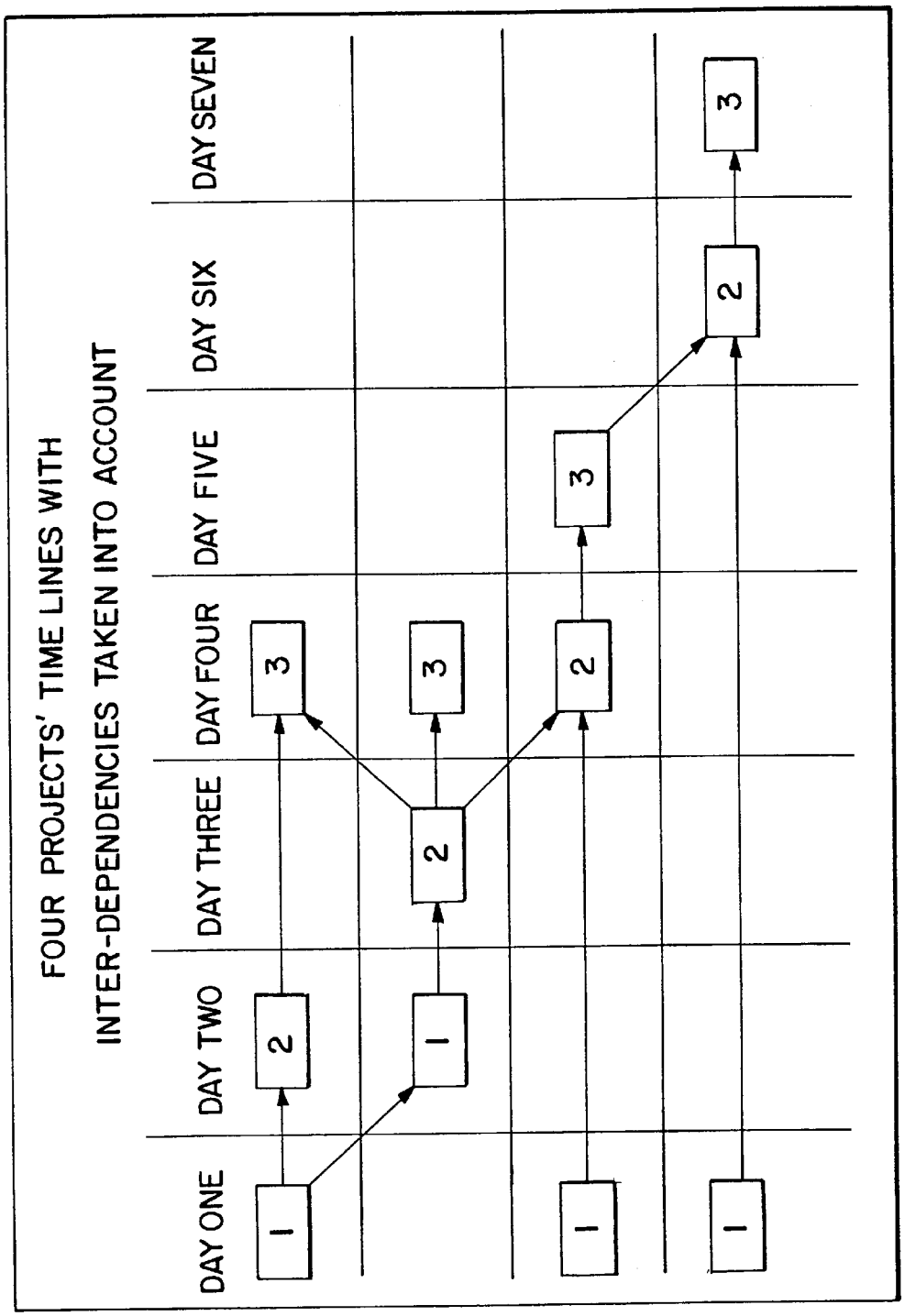
Figure 2C:
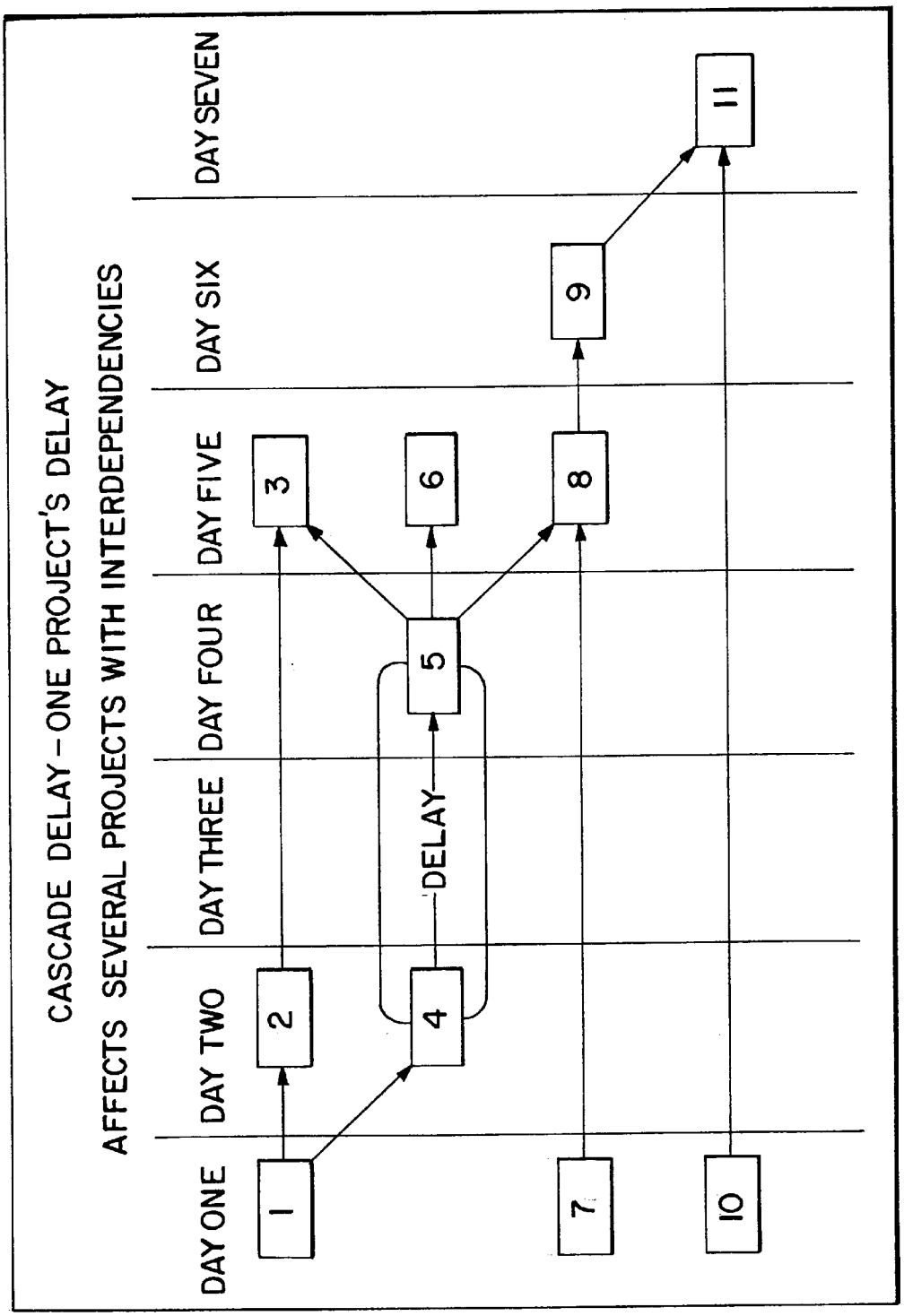

Referring now to FIGS. 2A,2B,2C, four different projects 70a, 70b, 70c, 70d, each with three work stages slated to last one day, are illustrated. Alone, each project should take three days to complete; however, some of the work stages must await the completion of work stages in other projects. With such an interdependency of work stages, a single change to a work stage can cause a large sequence of cascade schedule changes. FIG. 2B clarifies the actual flow of completion for each project illustrated in FIG. 2A. Projects 1, 3 and 4 can begin on day one, but Project 2 is delayed by a day until the completion of work stage 1 in Project 1. Though Project 3 can start on day one, it has a two day delay before work can continue as it awaits the completion of work stage 2 for Project 2, and so forth. Though requiring the same number of days to complete, and even though it began at the same time as Project 1, Project 4 requires three extra days to complete because of work stage 3 of Project 3.

FIG. 2C illustrates the cascade effect caused to the four projects in FIGS. 2A and 2B when a single work stage in one of the projects is delayed. Because work stage 3 in Projects 1 and 2, and work stage 2 in Project 3 are all dependent upon the completion of work stage 2 in Project 2, they are each delayed until work stage 2 in Project 2 is completed.

Figure 3A:
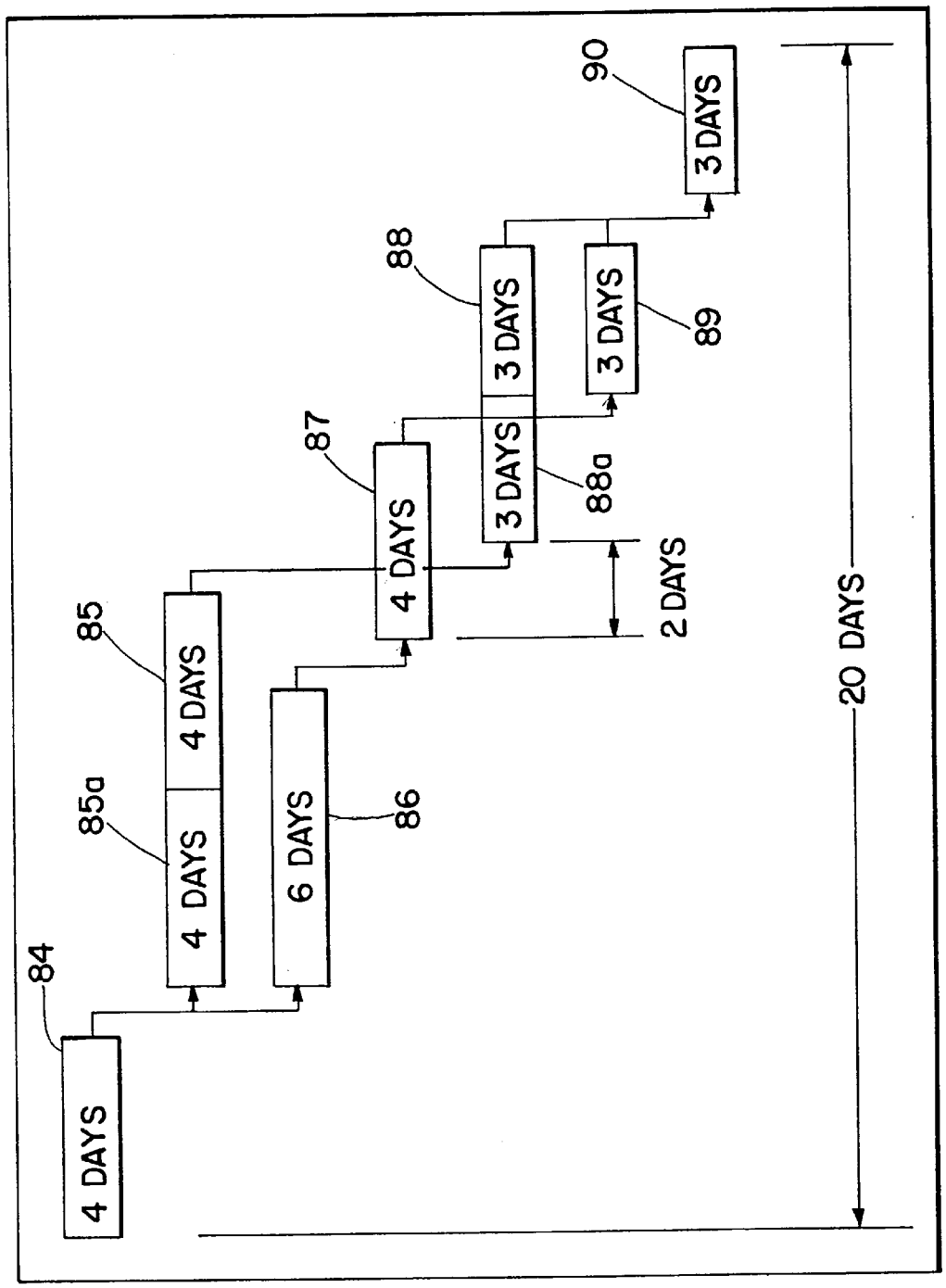
FIGS. 3A, 3B illustrate adding preceding float time to various work stages in a CPM schedule, according to the present invention.
Figure 3B:
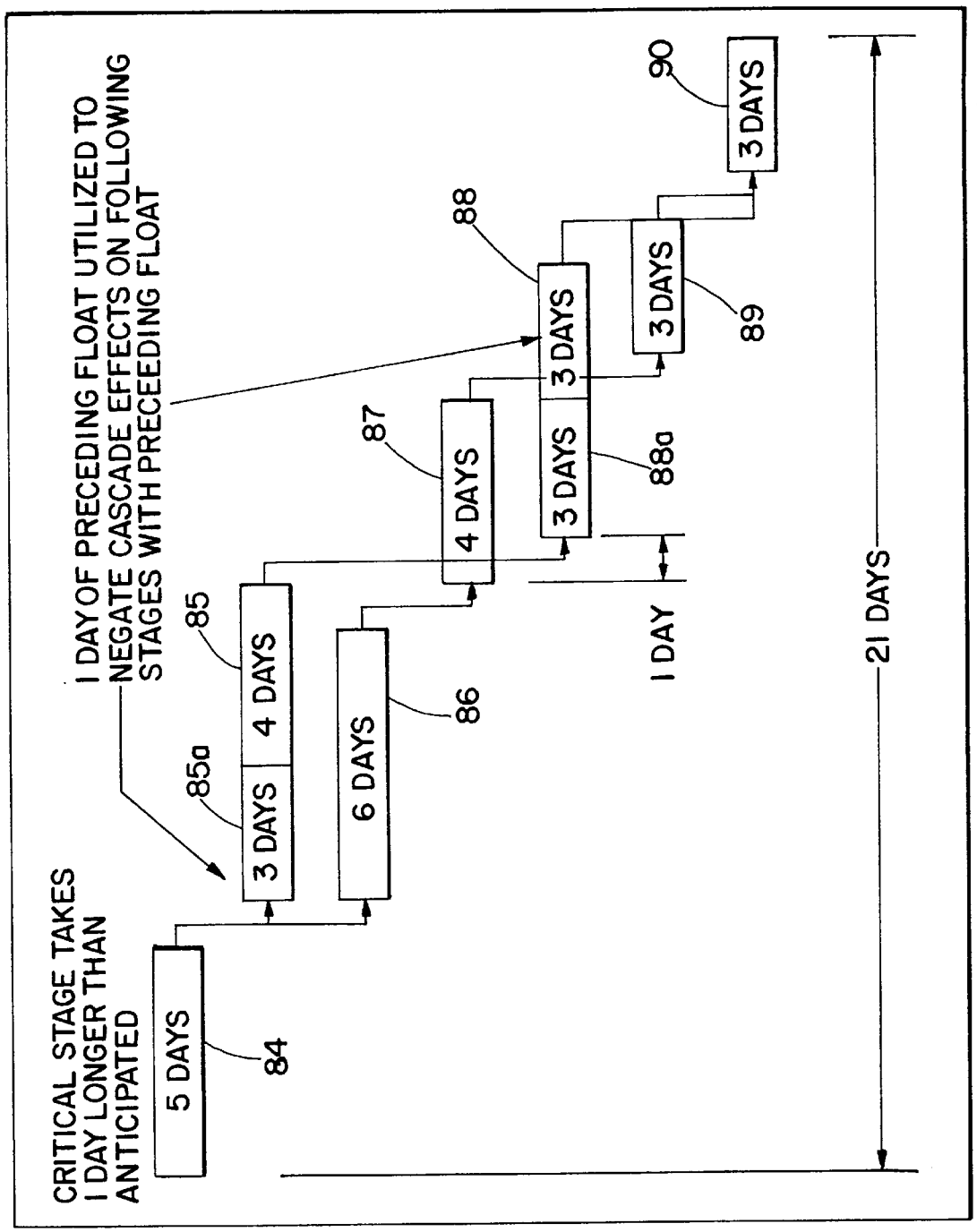

According to another aspect of the present invention, the Distributed Scheduling Subsystem 28 prevents small schedule changes to critical path schedules from causing large cascading schedule changes. This is accomplished by adding a quantity of time, referred to as "float time", to the starting time of a selected work stage or activity, as illustrated in FIGS. 3A and 3B. FIG. 3A illustrates multiple work stages 84–90 which define a critical path. Work stages 85, 88 include preceding float time 85a, 88a, respectively, prior to their starting time. As a result of the preceding float time, work stages 85, 88 are not on the critical path that determines the minimum length of the schedule. Note that there is a two day difference between the start of work stage 88 with preceding float 88a and work stage 87.

FIG. 3B depicts the effects on the schedule illustrated in FIG. 3A as a result of a one day delay to the first work stage 84. Consistent with CPM scheduling techniques, each work stage on the critical path is delayed by one day, causing the entire schedule to take one day longer than originally planned. However, the actual work days scheduled for work stage 85 remained the same and the available preceding float 85a has simply been reduced. The entire cascade potential on the subsequent work stage with preceding float time has thus been absorbed. As a result, the preceding float time remains unchanged for work stage 88 even though other work stages around it, have been adjusted. Note the two day gap between work stages 87 and preceding float 88a (FIG. 3A) has been reduced to only 1 day. Utilizing the preceding float allowed the fabricator's system to manage the start times after the delay so that the system did not automatically bump the succeeding work stage back an additional day. Rather, the system utilized the pre-determined preceding float in order to hold the later work stages to their original start dates, therefore not all work stages were changed, thus not all suppliers were affected.

According to the present invention, if a work stage in the critical path has an ending time later than scheduled, preceding float time on following work stages can prevent them from being rescheduled. When a work stage starting or ending time is modified, the preceding float time is adjusted in order to keep the actual work stage starting time the same. Preferably, the preceding float quantity is restricted such that it cannot go below zero or above a maximum preceding float quantity.

Automatic Product Information Updating

Typically, product distributors purchase products from product manufacturers and sell them to retailers and end users. When product manufacturers make changes to their products, or change information about their products, distributors typically accumulate this information and retransmit it (in printed or electronic form) to retailers and end users. The task of collecting and re-transmitting product information can be daunting. The present invention, through the Network Service Distribution System 20, makes product manufacturer information available to all network members who need the information without the duplicative efforts of distributors. The present invention allows product information to flow directly from manufacturers to retailers, distributors, and end users without interfering with the established channels of trade and business relationships.

The present invention, via the Distributed Product Data Management Subsystem 34, facilitates the electronic distribution of product information from network members who are product manufacturers to other network members. Because network members can view product information electronically and because the information is updated by manufacturers and automatically distributed down through the network, network members who are distributors do not have to maintain and redistribute constantly changing manufacturer product information.

According to one aspect of the present invention, a computer based product catalog system is provided. The computer based product catalog system includes multiple electronically stored manufacturer catalogs which include descriptive text, numerical data (measurements), multimedia information (video, audio, etc.) describing items manufactured by respective manufacturers, and based on standardized data models for different product types. An electronically stored distributor catalog including links to manufacturer product information, modifications to the descriptions of selected items from the various manufacturers, and distributor specific data regarding availability, deliver schedules, and the like. Also included within the system is a subsystem for automatically updating the descriptions of items within the manufacturer catalogs, and a subsystem, responsive to the automatic updating subsystem, for maintaining the links to items within the distributor catalog. A terminal, operatively connected to the manufacturer catalogs and to the distributor catalog, may be provided for viewing item descriptions within the manufacturer and distributor catalogs at the retail level of product distribution. A subsystem may be provided within the terminal for ordering items from the manufacturer and distributor catalogs.

According to an embodiment of the present invention, each manufacturer may access the Distributed Product Data Management Subsystem 34 to enter and maintain product information, including images, specifications, descriptions, and wholesale and/or retail pricing information. Each distributor may access the Distributed Product Data Management Subsystem 34 to select and maintain the list of products they will provide from any number of different manufacturers. Retailers, end users, and the like, can view the products offered by all network member distributors, including the manufacturer's product information, without concern that the information is outdated or inaccurate. The present invention facilitates the organization and presentation of product information in numerous formats. For example, all products of a given type, all products by manufacturer, may be grouped and viewed together. Network members may also view product information directly from a given manufacturer.

Figure 6:
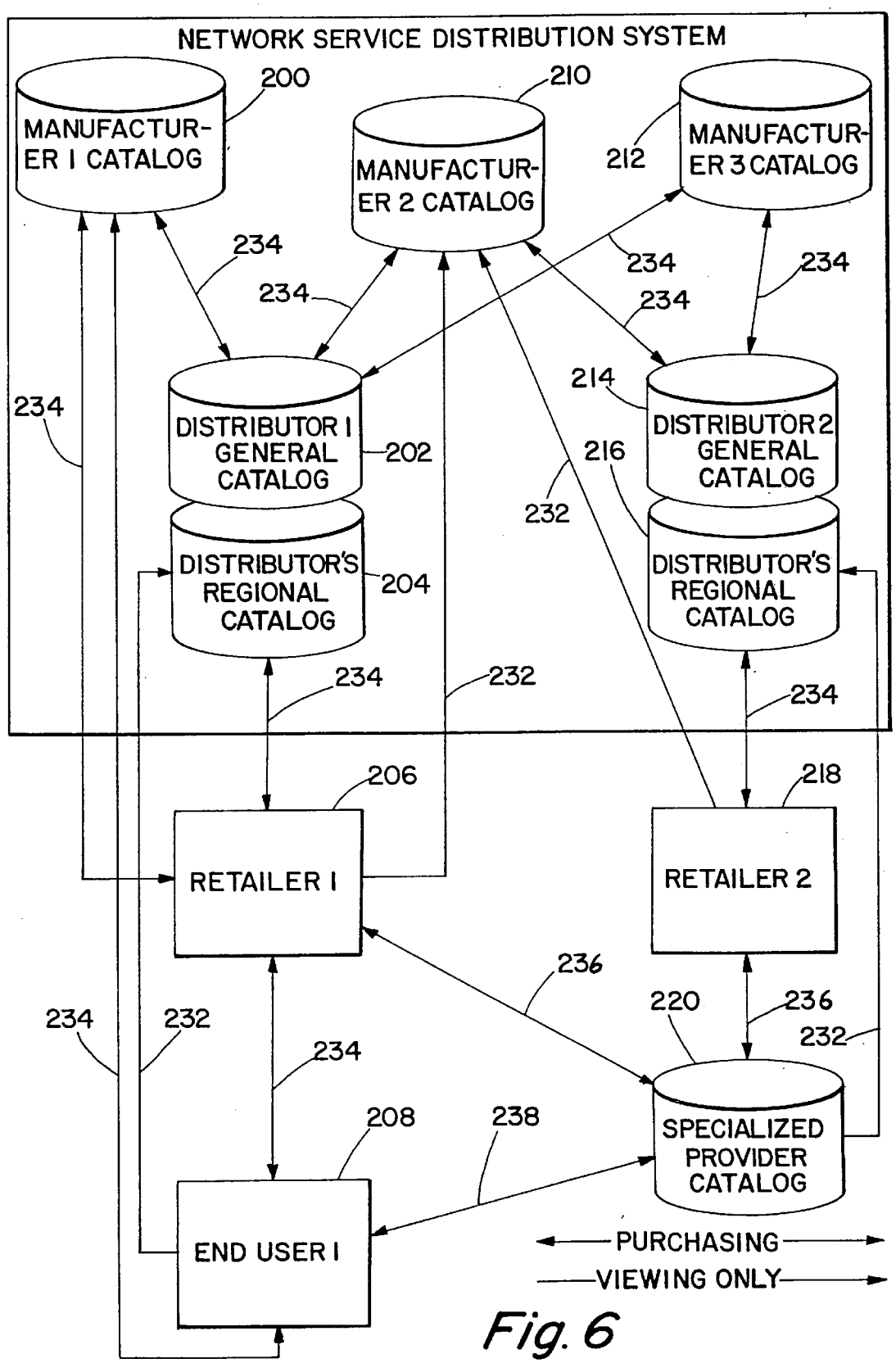
FIG. 6 illustrates a computer based product catalog system for distributing product information, according to the present invention.

Referring now to FIG. 6, the distribution of product information, according to one aspect of the present invention, is schematically illustrated. A variety of unique on-line product catalogs are shown being generated and updated without the need for distributors to reorganize and retransmit them as manufacturer specifications change. As shown, all products originate from manufacturers, (whether a single artisan fabricating unique works of art, or a major company creating thousands of reproductions of a single product). In all cases, a digital catalog record of textual descriptions, specifications, drawings, photographs, video clips, animation, price information, and any other desired information, is created for each product and made available to network members via the Network Service Distribution System 20.

In the illustrated embodiment shown in FIG. 6, Manufacturer 1 maintains an electronically stored catalog 200 of products for sale directly to distributors, retailers, and end users, each of whom is a network member. Each is allowed to view all or portions of Manufacturer 1's catalog 200, according to Manufacturer 1's discretion. End user 1 (208) may view the catalog 200 of Manufacturer 1 and may view the regional catalog 204 of Distributor 1 as indicated by single-arrowhead connectors 232. End User 1 (208) may purchase products from Retailer 1 (206) or from Manufacturer 1, as indicated by double-arrowhead connectors 234. Distributor 1 maintains a catalog 202 of products purchased from Manufacturers 1, 2, and 3 via their respective catalogs 200, 210, and 212, as indicated by double-arrowhead connectors 234.

Distributor 1 markets and distributes selected products from the catalogs of Manufacturers 1, 2, and 3 (200, 210, 212). The result is a unique catalog having a variety of products. Should any manufacturer update its product information via the Network Service Distribution System 20, it is automatically updated within Distributor 1's general catalog 202 and regional catalog 204. Because Distributor 1 allows Retailer 1 (206) and the End User 1 (208) to view its regional catalog 204, the updated product information from Manufacturer 1 is available without Distributor 1 having to reformat or retransmit the product information.

Still referring to FIG. 6, Manufacturer 2 supplies products to Distributor 1 and 2. Distributor 1 and 2 include information about these products within their respective catalogs 202, 214. This results in unique catalogs of products available to Retailer 1 (208) and Retailer 2 (218). In the illustrated embodiment, Retailer 1 (208) may view Manufacturer 2's catalog 210, as indicated by single-arrowhead connector 232, even though purchasing of products is only available through Distributor 1. Retailer 2 (218) may view Manufacturer 2's catalog 210, but can purchase only from Distributor 2 via Distributor 2's regional catalog 216. Manufacturer 3 is different from Manufacturer 2 in that only Distributors 1 and 2 may view or purchase products from its catalog 212, as indicated by double-arrowhead connectors 234. In the illustrated embodiment, a Specialized Provider has a unique catalog 220 of products purchased from Retailer 1 and 2 (206, 218) as indicated by double-arrowhead connectors 236. End User 1 (208) may view and purchase products from the Specialized Provider catalog 220 as indicated by double-arrowhead connector 238.

As illustrated in FIG. 6, the present invention facilitates the creation and automatic maintenance of many electronically stored product catalogs. In the illustrated embodiment, thirteen different catalog configurations containing products created by 3 different manufacturers are available to network members. Rather than thirteen different catalogs requiring reprinting or updating every time a manufacturer makes a change to specifications or product information, the present invention provides real-time updates as soon as they are made by a manufacturer.

Both the Network Service Distribution System 20 and each Calendar-Driven Desktop System 60, according to the present invention, may be implemented via a variety of computing devices, including, but not limited to, mainframe computing systems, mini-computers, and personal computers. It will be understood that a computer or other apparatus configured to execute the program code, embodied within computer usable media, operates as means for performing the various functions and carries out the methods of the various operations, according to the present invention. Stored computer readable program code also acts as a means for carrying out the various methods and functions of the present invention.

Computer readable program code means is provided for retrieving a copy of a first schedule from the network service distribution system, for changing at least one work stage starting or ending time in the copy of the first schedule, and for automatically changing the starting and ending times of work stages in the stored first schedule and a second stored schedule restrictively linked to the first schedule as a result of changes made to the copy of the first schedule. In particular, computer readable program code means is provided for each of the following: comparing a copy of a first schedule with the first schedule stored within the network service distribution system to identify changed work stage starting and ending times; identifying whether a restrictive link exists between a work stage of a first schedule and a work stage of a second schedule; determining whether the identified restrictive link permits the starting or ending times of the second schedule to be changed; and automatically changing the starting and ending times of the second schedule work stage, thereby synchronizing the first and second stored schedules.

The present invention may be written in various computer languages including, but not limited to, C++, Smalltalk, Java, and other conventional programming languages such as BASIC, FORTRAN and COBOL. The Network Service Distribution System 20 and the Calendar-Driven Desktop System 60 preferably run on current standard desktop computer operating systems such as, but not limited to, Windows®, Windows 95®, Windows NT®, UNIX®, and OS/2®. The present invention utilizes, in part, many standard features of current desktop configurations, such as the ability to store data locally, connect to the Internet, and display visual information.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A method of synchronizing schedules of separate business entities within the building industry, the schedules including a fabrication schedule of a builder and a plurality of supplier schedules for a respective plurality of suppliers of building materials or services, the fabrication schedule of the builder comprising a plurality of sequential work stages which are stored on a fabricator data processing system, the plurality of supplier schedules of the plurality of suppliers of building materials or services comprising a plurality of schedules for one of the sequential work stages which is performed by each of the suppliers of building materials or services and which is stored on a plurality of supplier data processing systems, the synchronizing method comprising the steps of:

obtaining the fabrication schedule of a builder from the fabricator data processing system;

obtaining the plurality of supplier schedules for a respective plurality of suppliers of building materials or services from the respective supplier data processing systems;

establishing restrictive links among the fabrication schedule of the builder and the plurality of supplier schedules for the respective plurality of suppliers of building materials or services, the restrictive links defining which suppliers will perform the sequential work stages of the fabrication schedule of the builder;

obtaining a change in at least one of the sequential work stages of the fabrication schedule of the builder from the builder via the fabricator data processing system or a change in a sequential work stage of a supplier schedule from a supplier of building materials or services via a respective supplier data processing system;

automatically modifying the restrictive links among the fabrication schedule of the builder and plurality of supplier schedules of the respective plurality of suppliers of building materials or services in response to the obtained change to thereby generate a modified fabrication schedule of the builder or at least one modified supplier schedule of at least one of the suppliers of building materials or services; and communicating the modified fabrication schedule of the builder or the at least one modified supplier schedule of at least one of the suppliers of building materials or services to the separate business entities in the building industry by communicating the modified fabrication schedule of the builder or the at least one modified supplier schedule of at least one of the respective suppliers of building materials or services to the fabricator data processing system and to at least one of the supplier data processing systems, respectively.

2. A method according to claim 1 wherein said restrictive links define work stage starting and ending times among the fabrication schedule and the plurality of supplier schedules.

3. A method according to claim 1 further comprising the step of returning an error message if a restrictive link cannot be modified in response to the obtained change.

4. A method of synchronizing schedules of separate business entities within the building industry, the schedules including a fabrication schedule of a builder and a plurality of supplier schedules for a respective plurality of suppliers of building materials or services, the fabrication schedule of the builder comprising a plurality of sequential work stages which are stored on a fabricator data processing system, the plurality of supplier schedules for the suppliers of building materials or services comprising a plurality of schedules for one of the sequential work stages which is performed by each of the suppliers of building materials or services and which is stored on a plurality of supplier data processing systems, the synchronizing method comprising the steps of:

obtaining the fabrication schedule of the builder from the fabricator data processing system;

obtaining the plurality of supplier schedules for the respective plurality of suppliers of building materials or services from the respective supplier data processing systems;

automatically selecting one of the suppliers of building materials or services from the plurality of suppliers of building materials or services;

communicating the selection to the supplier data processing system which corresponds to the selected supplier of building materials or services;

obtaining a change in at least one of the sequential work stages of the fabrication schedule of the builder from the builder via the fabricator data processing system or a change in a sequential work stage of a supplier schedule from a supplier of building materials or services via a respective supplier data processing system;

automatically modifying the restrictive links among the fabrication schedule of the builder and plurality of supplier schedules of the respective plurality of suppliers of building materials or services in response to the obtained change to thereby generate a modified fabrication schedule of the builder or at least one modified supplier schedule for a supplier of building materials and services; and communicating the modified fabrication schedule of the builder or the at least one modified supplier schedule of a supplier of building materials or services to the separate business entities within the building industry by communicating the modified fabrication schedule of the builder or the at least one modified supplier schedule of at least one of the respective suppliers of building materials or services to the fabricator data processing system and to at least one of the supplier data processing systems, respectively.

5. A method according to claim 4 further comprising the steps of:

determining that the selected supplier is not able to supply the work stage; and automatically reselecting a second supplier.

6. A scheduling system for synchronizing schedules of separate business entities within the building industry, the system comprising:

a fabricator data processing system which stores a fabrication schedule of a builder comprising a plurality of sequential work stages;

a plurality of supplier data processing systems, each of which stores a schedule for one of the sequential work stages which is performed by a respective supplier of building materials or services;

means for obtaining the fabrication schedule of the builder from the fabricator data processing system;

means for obtaining the plurality of supplier schedules for the respective plurality of suppliers of building materials or services from the respective supplier data processing systems;

means for establishing restrictive links among the obtained fabrication schedule of the builder and the obtained plurality of supplier schedules for the respective plurality of suppliers of building materials or services, the restrictive links defining which suppliers of building materials or services will perform the sequential work stages of the fabrication schedule of the builder;

means for obtaining a change in at least one of the sequential work stages of the fabrication schedule of the builder from the builder via the fabricator data processing system or a change in a sequential work stage of a supplier schedule from a supplier of building materials or services via a respective supplier data processing systems;

means for automatically modifying the restrictive links among the fabrication schedule of the builder and plurality of supplier schedules of the respective plurality of suppliers of building materials and services in response to the obtained change to thereby generate a modified fabrication schedule of the builder or at least one modified supplier schedule for a supplier of building materials or services; and means for communicating the modified fabrication schedule of the builder or the modified supplier schedule of a supplier of building materials or services to the separate business entities within the building industry by communicating the modified fabrication schedule of the builder or the modified supplier schedule of a supplier of building materials or services to the fabricator data processing system and to at least one of the supplier data processing systems, respectively.

7. A scheduling system according to claim 6 wherein said means for obtaining the fabrication schedule, said means for obtaining the plurality of supplier schedules, said means for establishing restrictive links, said means for obtaining a change in at least one of the sequential work stages, said means for automatically modifying the restrictive links, and said means for communicating the modified fabrication schedule or the modified supplier schedule, are contained within said fabricator data processing system.

8. A computer program product for synchronizing schedules of separate business entities within the building industry, the computer program product configured for use with a fabricator data processing system which stores a fabrication schedule of a builder comprising a plurality of sequential work stages, and a plurality of supplier data processing systems, each of which stores a schedule for one of the sequential work stages which is performed by a respective supplier of building materials or services, said computer program product comprising;

a computer usable medium having computer readable program code means embodied in said medium for obtaining the fabrication schedule of the builder from the fabricator data processing system;

the computer usable medium having computer readable program code means embodied in said medium for obtaining the plurality of supplier schedules for the respective plurality of suppliers of building materials or services from the respective supplier data processing systems;

the computer usable medium having computer readable program code means embodied in said medium for establishing restrictive links among the obtained fabrication schedule of the builder and the obtained plurality of supplier schedules for the respective plurality of suppliers of building materials or services, the restrictive links defining which suppliers of building materials or services will perform the sequential work stages of the fabrication schedule of the builder;

the computer usable medium having computer readable program code means embodied in said medium for obtaining a change in at least one of the sequential work stages of the fabrication schedule of the builder from the builder via the fabricator data processing system or a change in a sequential work stage of a supplier schedule from a supplier of building materials or services via a respective supplier data processing system;

the computer usable medium having computer readable program code means embodied in said medium for automatically modifying the restrictive links in response to the obtained change to thereby generate a modified fabrication schedule of the builder or at least one modified supplier schedule of a supplier of building materials or services; and the computer usable medium having computer readable program code means embodied in said medium for communicating the modified fabrication schedule of the builder or the modified supplier schedule of a supplier of building materials or services to the separate business entities within the building industry be communicating the modified fabrication schedule of the builder or the modified supplier schedule of a supplier of building materials or services to the fabricator data processing system and to at least one of the supplier data processing systems, respectively.

* * * * *

UNITED STATES PATENT AND TRADEMARK OFFICE
CERTIFICATE OF CORRECTION

PATENT NO. : 5,923,552
DATED : July 13, 1999
INVENTOR(S) : Brown, et. al.

It is certified that error appears in the above-identified patent and that said Letters Patent is hereby corrected as shown below:

Title page, item [54] and col. 1,
The title should read -- SYSTEMS AND METHODS FOR FACILITATING THE EXCHANGE OF INFORMATION BETWEEN SEPARATE BUSINESS ENTITIES WITHIN THE BUILDING INDUSTRY.

Column 20, line 15, please delete "systems" and insert - - system - -.

Signed and Sealed this

Eleventh Day of April, 2000

Attest:

Q. TODD DICKINSON

Attesting Officer

Director of Patents and Trademarks